US011943269B2

(12) United States Patent
Eftekhari et al.

(10) Patent No.: US 11,943,269 B2
(45) Date of Patent: Mar. 26, 2024

(54) TRANSACTIONS OVER LIVE MEDIA

(71) Applicant: Intuit Inc., Mountain View, CA (US)

(72) Inventors: Amir Eftekhari, San Diego, CA (US); Roger C. Meike, Mountain View, CA (US); Luciano Sibio, Mountain View, CA (US); Itai Jeczmien, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 309 days.

(21) Appl. No.: 17/008,582

(22) Filed: Aug. 31, 2020

(65) Prior Publication Data

US 2022/0070244 A1    Mar. 3, 2022

(51) Int. Cl.
*H04L 65/612* (2022.01)
*G06F 9/448* (2018.01)
*H04L 9/00* (2022.01)
*H04L 9/06* (2006.01)

(52) U.S. Cl.
CPC .......... *H04L 65/612* (2022.05); *G06F 9/4498* (2018.02); *H04L 9/0643* (2013.01); *H04L 9/50* (2022.05)

(58) Field of Classification Search
CPC ............... H04L 65/4084; H04L 9/0643; H04L 2209/38; G06F 9/4498
USPC ....................................................... 709/231
See application file for complete search history.

(56) References Cited

U.S. PATENT DOCUMENTS

| | | | | |
|---|---|---|---|---|
| 9,602,880 B2 * | 3/2017 | Ansari | ................... | B05D 3/002 |
| 11,126,977 B1 * | 9/2021 | Craggs | ................... | G06Q 30/04 |
| 11,757,891 B1 * | 9/2023 | Sahay | ..................... | H04L 63/08 |
| | | | | 726/4 |
| 2002/0016839 A1 * | 2/2002 | Smith | .................... | G06Q 40/04 |
| | | | | 709/224 |
| 2009/0279455 A1 * | 11/2009 | Wang | ..................... | H04L 51/36 |
| | | | | 370/260 |
| 2014/0195675 A1 * | 7/2014 | Silver | ................... | H04L 65/611 |
| | | | | 709/224 |
| 2014/0341029 A1 * | 11/2014 | Allan | ...................... | H04L 45/02 |
| | | | | 370/235 |
| 2019/0102409 A1 * | 4/2019 | Shi | ........................ | G06F 9/5077 |
| 2019/0366210 A1 * | 12/2019 | Beltran | .................. | A63F 13/42 |
| 2019/0370366 A1 * | 12/2019 | Scott | ..................... | H04L 9/0637 |

FOREIGN PATENT DOCUMENTS

| | | | | |
|---|---|---|---|---|
| CA | 2182666 C | * | 12/2004 | ....... G08B 13/19669 |
| JP | 2016012218 A | * | 1/2016 | |

* cited by examiner

*Primary Examiner* — Wing F Chan
*Assistant Examiner* — John Fan
(74) *Attorney, Agent, or Firm* — Lathrop GPM LLP

(57) ABSTRACT

After a host client establishes a multimedia stream with a guest client, host data is received from a host application. A state machine is updated using the host data. The host application executes on the host client. Guest data is received from a guest application. The state machine is updated using the guest data. The guest application executes on the guest client. Transaction data is propagated between the host application and the guest application. The transaction data is presented with the multimedia stream. The transaction data includes the host data and the guest data. Provider data is generated responsive to updating the state machine with the host data and the guest data. The provider data is sent to the guest client. The provider data is presented with the multimedia stream by the guest application on the guest client.

18 Claims, 10 Drawing Sheets ary stream with a guest client, wherein the provider data is presented with the multimedia stream by the guest application on the guest client.

TRANSACTIONS OVER LIVE MEDIA

BACKGROUND

Users may communicate with each other with videotelephony applications using live real-time video and audio in a multimedia stream. A challenge is to initiate transactions between users communicating over a multimedia stream.

SUMMARY

In general, in one or more aspects, the disclosure relates to a method of performing transactions over live media. After a host client establishes a multimedia stream with a guest client, host data is received from a host application. A state machine is updated using the host data. The host application executes on the host client. Guest data is received from a guest application. The state machine is updated using the guest data. The guest application executes on the guest client. Transaction data is propagated between the host application and the guest application. The transaction data is presented with the multimedia stream. The transaction data includes the host data and the guest data. Provider data is generated responsive to updating the state machine with the host data and the guest data. The provider data is sent to the guest client. The provider data is presented with the multimedia stream by the guest application on the guest client.

In general, in one or more aspects, the disclosure relates to a system including a processor and a memory. An application with instructions is stored in the memory, executed on the processor, and configured for receiving, after a host client establishes a multimedia stream with a guest client, host data from a host application and updating a state machine using the host data. The host application executes on a host client. Guest data is received from a guest application. The state machine is updated using the guest data. The guest application executes on a guest client. Transaction data is propagated between the host application and the guest application. The transaction data is presented with the multimedia stream. The transaction data includes the host data and the guest data. Provider data is generated responsive to updating the state machine with the host data and the guest data. The provider data is sent to the guest client. The provider data is presented with the multimedia stream by the guest application on the guest client.

In general, in one or more aspects, the disclosure relates to a system including a processor and a memory. A host application is stored in the memory and executes on the processor. An intermediary application is stored in the memory and executes on the processor. The host application is configured for establishing a multimedia stream with a guest client. The intermediary application is configured for: receiving host data from a host application and updating a state machine using the host data, the host application executing on a host client; receiving guest data from a guest application and updating the state machine using the guest data, the guest application executing on the guest client; and propagating transaction data between the host application and the guest application, the transaction data presented with the multimedia stream, and the transaction data comprising the host data and the guest data. The host application is further configured for presenting the guest data with the multimedia stream on the host client. The intermediary application is further configured for: generating provider data responsive to updating the state machine with the host data and the guest data; and sending the provider data to the guest client, wherein the provider data is presented with the multimedia stream by the guest application on the guest client.

Other aspects of the invention will be apparent from the following description and the appended claims.

DETAILED DESCRIPTION

Figure 1A:
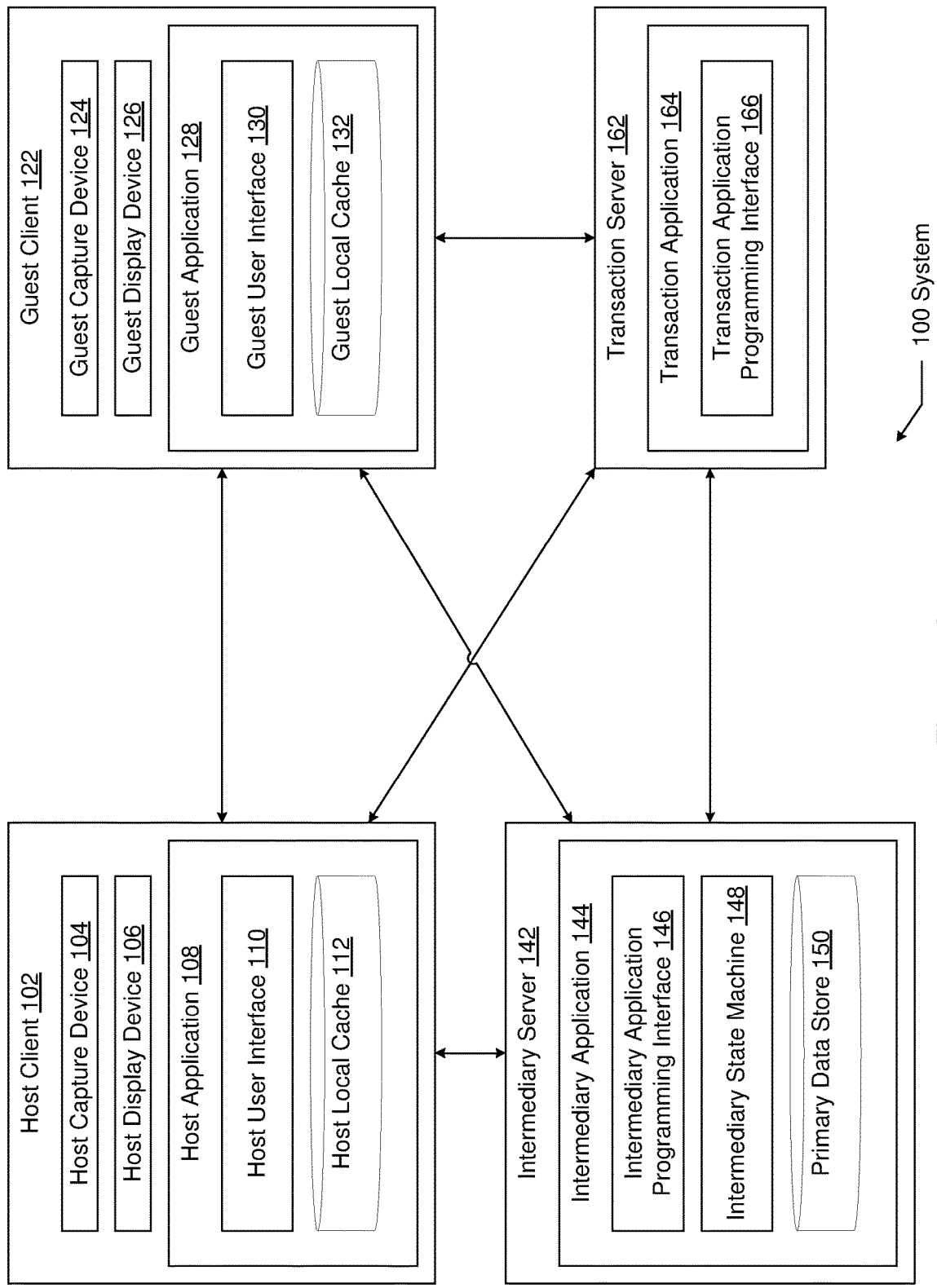
FIG. 1A and FIG. 1B show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure initiate transactions over live media. A host user and a guest user may communicate with each other using a host application and a guest application executing on their respective computing devices. The host application and the guest application include videotelephony applications for live video and audio communication between the host user and the guest user with a multimedia stream. The host user and a guest user may discuss the transaction and then use the host application and the guest application to initiate the transaction, which may be executed with a separate transaction application.

A transaction is a transfer of a numerical value from one data record to another data record. Transaction data is the metadata related to a transaction. For example, transaction data may include a numerical amount that identifies the numerical value being transferred, a first identifier for a first data record, a second identifier for a second data record, and multiple text descriptions that describe the transaction and may be related to the first and second identifiers. Host data may include text descriptions for the first identifier (name, contact information, etc.). Guest data may include text descriptions for the second identifier (name, contact information, etc.).

A multimedia stream is a group of media streams that transfer media data (audio and/or video) between two computing devices, which may be done live on a real-time basis. The media stream may include metadata that includes stream definitions that define the types and parameters for individual streams. As an example, a multimedia stream between a smartphone and a personal computer may include the audio and video streams captured with the cameras and microphones of both devices and transferred between the devices so that each devices may display the audio and video captured with the other device.

Figure 1B:
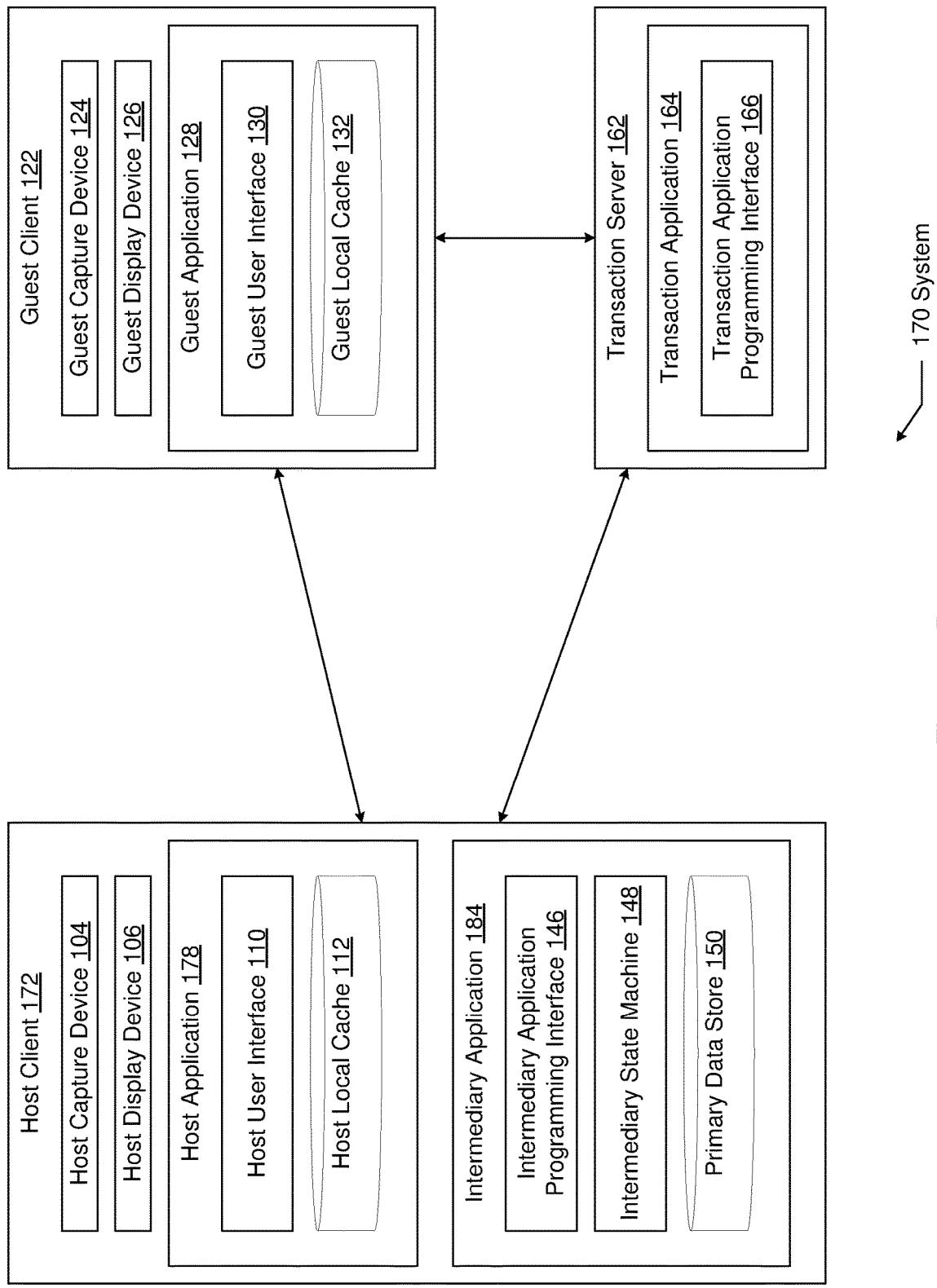

FIG. 1A and FIG. 1B show diagrams of embodiments that are in accordance with the disclosure. FIG. 1A shows an example of a client server implementation. FIG. 1B shows an example of a peer to peer implementation. The embodiments of FIG. 1A and FIG. 1B may be combined and may include or be included within the features and embodiments described in the other figures of the application. The features and elements of FIG. 1A and FIG. 1B are, individually and as a combination, improvements to the technology of machine learning. The various elements, systems, and components shown in FIG. 1A and FIG. 1B may be omitted, repeated, combined, and/or altered as shown from FIG. 1A and FIG. 1B. Accordingly, the scope of the present disclosure should not be considered limited to the specific arrangements shown in FIG. 1A and FIG. 1B.

Turning to FIG. 1A, the system (100) may process transactions over live streaming media. The system (100) includes the host client (102), the guest client (122), the intermediary server (142) and the transaction server (162). Users of the host client (102) and the guest client (122) establish a streaming media connection, (a voice call, a conference call, a video call, etc.) and initiate a transaction. Details of the transaction may be overlaid onto streaming media in the user interfaces presented by the host client (102) and the guest client (122).

As an example, the host user of the client (102) may be a retail services provider and the guest user of the guest client (122) may be customer of the host user. After discussing the services to be provided over the streaming media connection, the host user may initiate a transaction that is displayed in the user interfaces of both the host client (102) and the guest client (122). The intermediary application (144) records the state of the transaction with the intermediary state machine (148). After the transaction details are finalized, the guest client uses provider data generated by the intermediary server to execute the transaction with the transaction server (162). The provider data includes host data used by the guest client (122) to perform a transaction utilizing the transaction server (162). The provider data may include an identifier linked to the host user or host client, which may include a uniform resource locator (URL), a token, a digital signature, a certificate, parameter values, etc. that are used by the transaction application (164) to process a transaction.

Figure 5A:
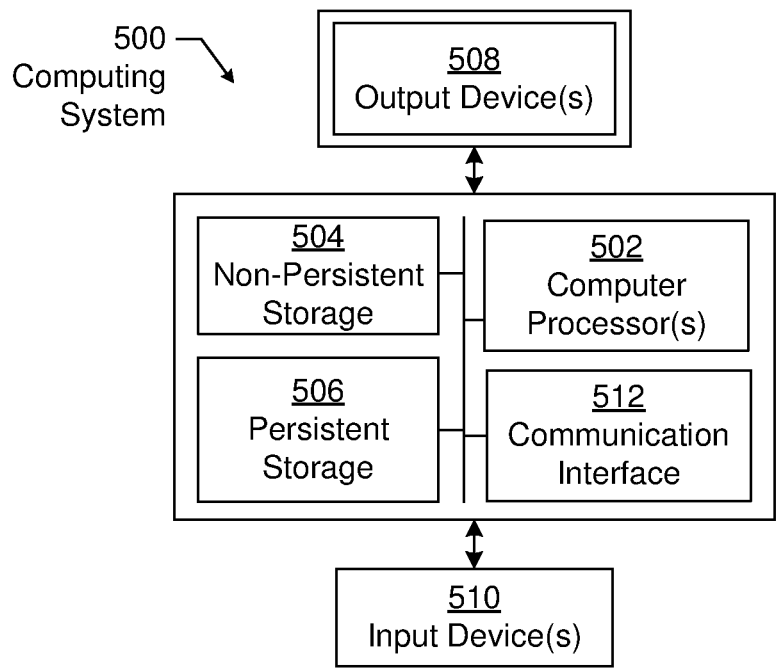
FIG. 5A and FIG. 5B show computing systems in accordance with disclosed embodiments.
Figure 5B:
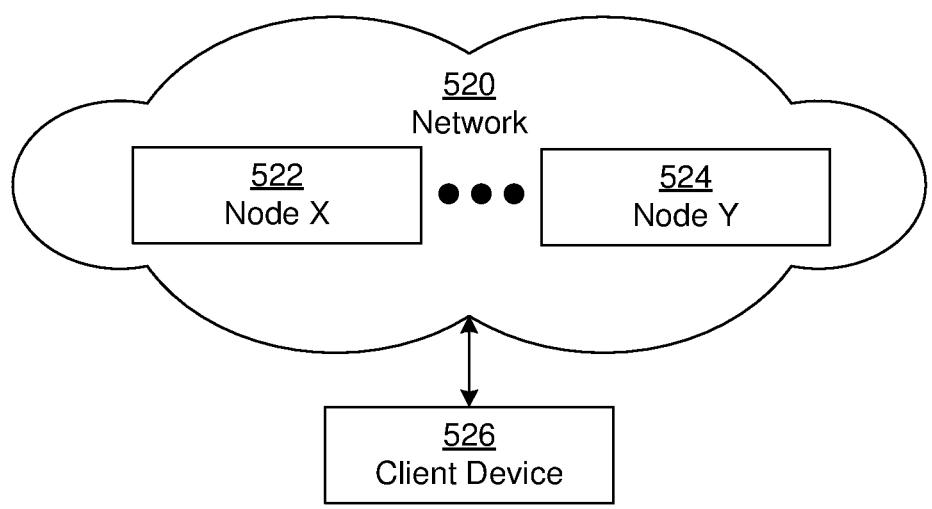

The host client (102) is a computing system in accordance with those described in FIGS. 5A and 5B and, for example, may be a smartphone or a desktop computer. The host client (102) receives streaming media from the guest client (122), receives transaction data from the intermediary server (142), and transmits host data to the intermediary server (142). The host client (102) may initiate a transaction with the transaction server (162) that is completed with the guest client (122). The host client (102) includes the host capture device (104), the host display device (106) and the host application (108). In one embodiment, the host user of the host client (102) may be the seller involved in the transaction.

The host capture device (104) is a media capture device that records the video and audio data that form the host streaming media sent from the host client (102) to the guest client (122). The host capture device (104) may include multiple cameras and microphones incorporated into or attached to the host client (102). As examples, the host capture device (104) may include the cameras and microphones of a smartphone and may include the cameras and microphones of a webcam attached to a personal computer.

The host display device (106) is a media presentation device that presents audio and video information to the host user. The host display device (106) may include multiple monitors, displays, and speakers that output audio and/or video information. For example, host display device (106) may include the touchscreen display and speaker output of a smartphone and the monitor and speakers of a personal computer.

The host application (108) is a set of programs stored in the memory of the host client (102) and executing on the processors of the host client (102) that handles the multimedia streaming between the host client (102) and the guest client (122), receives host data for a transaction, and communicates with the intermediary application (144) to initiate the transaction. The host application (108) includes the host user interface (110) and the host local cache (112).

The host user interface (110) is the interface displayed on the host display device (106) that the host user uses to interact with the host application (108). The host user interface (110) may inject the transaction data into the presentation of media by the host client (102). For example, the host user interface (110) may combine streaming video from the guest client (122) with host video captured with the host capture device (104) into a single video stream onto which transaction data is overlaid and the displayed on the host display device (106).

The host local cache (112) is a memory that stores a local copy of the transaction data, which is primarily stored in the primary data store (150) of the intermediary application (144). Changes to the transaction data in the host local cache (112) may be pushed to the host user interface (110) in real time so that the display of information on the host display device (106) is continuously updated with the most recent information.

The guest client (122) is a computing system in accordance with those described in FIGS. 5A and 5B and, for example, may be a smartphone or a desktop computer. The guest client (122) receives streaming media from the host client (102), receives transaction data from the intermediary serer (142), transmits host data to the intermediary server (142), and may execute transactions with the transaction server (162). The guest client (122) includes the guest capture device (124), the guest display device (126), the guest application (128), the guest user interface (130), and the guest local cache (132), which are comparable to the similarly named components from the host client (102) and may operate in an analogous fashion. The host application (108) and the guest application (128) may be different instances of the same application installed on different devices, i.e., the host client (102) and the guest client (122).

The intermediary server (142) is a computing system in accordance with those described in FIGS. 5A and 5B and, for example, may be a server hosted in by a cloud computing environment. The intermediary server (142) receives host data from the host application (108), receives guest data from the guest application (128), processes the host data and guest data to update the intermediary state machine (148) and generate transaction data, propagates the transaction data to the host application (108) and the guest application (128). The intermediary server (142) may send provider data to the guest application (128) for the guest client (122) to complete a transaction. The intermediary server (142) may initiate a transaction with the server (162) that is completed with the guest client (122). The intermediary server (142) includes the intermediary application (144).

The intermediary application (144) is a set of programs stored in the memory of the intermediary server (142) and executing on the processors of the intermediary server (142) that handle the propagation of transaction data between the host application (108) and the guest application (128), that update the intermediary state machine (148), and that store transaction data to the primary data store (150). The intermediary application (144) includes the intermediary application programming interface (146), the intermediary state machine (148), and the primary data store (150).

The intermediary application programming interface (146) is the interface used by the host application (108) and the guest application (128) to transfer transaction data and update the intermediary state machine (148).

The intermediary application programming interface (146) may be a web application programming interface (API) using interactions based on representational state transfer (REST) or simple object access protocol (SOAP) standards. A RESTful web API may use HTTP methods to access resources or services using uniform resource locator (URL)-encoded parameters with the use of JavaScript object notation (JSON) or extensible markup language (XML) formatted text to transmit data and invoke the methods of the web API.

The intermediary state machine (148) is a data structure that includes multiple states that may be transitioned between based on inputs received by the intermediary application (144). The transitions may identify data that is used to proceed from one state to a different state. As an example, one embodiment of the intermediary state machine (148) may include the states in the table below.

TABLE 1

| State | Description |
|---|---|
| State 1 | Streaming connection established: the streaming media connection has been established between the host client (102) and the guest client (122) but the transaction has not been defined. |
| State 2 | Numerical value identified: a numerical value for the transaction has been defined but the host and guest information (i.e., host data and guest data) has not been updated. |
| State 3 | Host and guest information completed: the host and guest information has been received, processed, and completed, but the transaction has not been performed and verified |
| State 4 | Transaction verified: the transaction has been processed and verified. |

The primary data store (150) is a memory that stores the primary copy of the transaction data and may store the state of the intermediary state machine (148). The primary data store (150) is updated with the host data and guest data received from the host application (108) and the guest application (128) by the intermediary application (144). After transaction data is stored in the primary data store (150), the transaction data may be pushed out to the host local cache (112) and the guest local cache (132).

The transaction server (162) is a computing system in accordance with those described in FIGS. 5A and 5B and, for example, may be a server hosted in by a cloud computing environment. The transaction sever hosts the transaction application (164). The transaction application (164) executes transactions that have been discussed by the host user and the guest users over live streaming media using the transaction application programming interface (166). The transaction application programming interface (166) may be a web API using interactions based on representational state transfer (REST) or simple object access protocol (SOAP) standards with methods invoked using HTTP with data in JSON or XML format.

In one embodiment, the transaction application (164) may include a web-based payment processing service that processes the transaction as a payment transaction. For example, the host user of the host client (102) may be a retailer that sells goods (products or services) to the guest user of the guest client (122). After discussion the transaction, the users agree to an amount and the guest user executes a payment transaction with the transaction server (162) using the guest client (122).

In one embodiment, the transaction application (164) may include cloud services portal that processes the transaction as a cloud services request. For example, the host user of the host client (102) may be a programmer and the guest user is looking to grant access for the host user to the cloud-based servers and data maintained by the guest user. After discussing the transaction, e.g., the limits of access and scope of work for the host user, the users agree to the transaction (e.g., granting a certain number of days of access to the cloud based servers) and the guest user executes the transaction to give the host user access to the cloud based servers.

Turning to FIG. 1B, the system (170) may process transactions over live streaming media. The system (170) operates in a peer to peer fashion as compared to the system (100) of FIG. 1A, which operates in a client server fashion.

The system (170) includes the host client (172), the guest client (122), and the transaction server (162). The guest client (122) and the transaction server (162) and related components operate as described in FIG. 1A.

The host client (172) includes the host capture device (104), the host display device (106), the host application (178), and the intermediary application (184). The host capture device (104), and the host display device (106) operate as described with respect to FIG. 1A.

The host application (178) and the intermediary application (184) operate similar to the host application (108) and the intermediary application (144) from FIG. 1A but without the use of the intermediary server (142).

Figure 2:
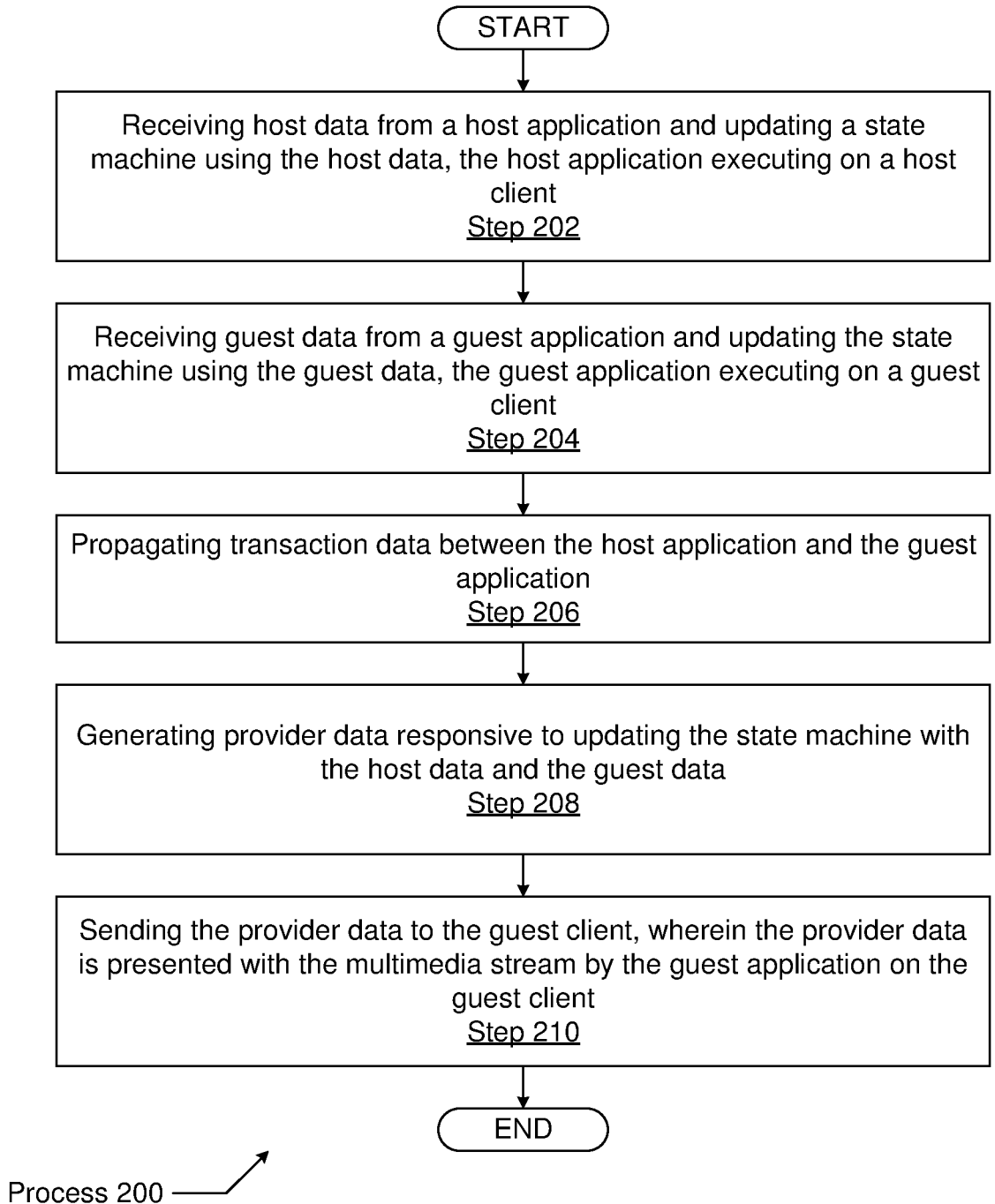
FIG. 2 shows a flowchart in accordance with disclosed embodiments.

FIG. 2 shows a flowchart of the process (200) in accordance with the disclosure. The process (200) of FIG. 2 initiates transactions over live media. The embodiment of FIG. 2 may be combined and may include or be included within the features and embodiments described in the other figures of the application. The features of FIG. 2 are, individually and as an ordered combination, improvements to the technology of computing systems and streaming media systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turing to FIG. 2, in Step 202, host data is received from a host application and a state machine is updated using the host data. The host data is received by an intermediary application that manages the state machine for initiating the transaction between the host user and the guest user. In one embodiment, the host data includes a numerical value for the transaction and may include host identification information, such as a host account identifier, a host name, host contact information, etc. In one embodiment, the state machine may be updated by transitioning between different states based on the host data. As an example, when the host data includes a numerical value, the state machine may transition from State 1 ("streamlining connection established") to State 2 ("numerical value identified").

The host application may capture host media. The host media may include audio and video captured with the cameras and microphones of the host client. The host media may be transmitted to the guest client. Combinations of the host media, the guest media, and the transaction data may be displayed live in real-time by the host application on the host client.

In Step 204, guest data is received from a guest application and the state machine is updated using the guest data. The guest data is received by the intermediary application that manages the state machine. In one embodiment, the guest data includes contact information of the guest user. In one embodiment, the state machine may be updated by transitioning from State 2 ("numerical value identified") to State 3 ("host and guest information completed").

The guest application may capture guest media. The guest media may include audio and video captured with the cameras and microphones of the guest client. The guest media may be transmitted to the host client. Combinations of the guest media, the host media, and the transaction data may be displayed live in real-time by the guest application on the guest client.

In Step 206, transaction data is propagated between the host application and the guest application. The transaction data includes the host data and the guest data. Each update to the state machine and each update to the primary data store may trigger the intermediary application to send the updated information to the other applications. For example, after receiving the host data, the intermediary application may update the state machine using the host data, store the host data in the primary data store, and then send transaction data that includes the host data to the guest application. Similarly, after receiving the guest data, the intermediary application may update the state machine using the guest data, store the guest data in the primary data store, and then send transaction data that includes the guest data to the host application. To propagate the transaction data, the intermediary application may send the transaction data (updated with host data or guest data) to both the host application and the guest application, which update the host local cache and the guest local cache, respectively, with the updated transaction data.

The transaction data may be presented with the multimedia stream on the host client and the guest client. The guest application may overlay the host data onto a display of the multimedia stream in real time on the guest client and the host application may overlay the guest data onto a display of the multimedia stream in real time on the host client. For example, the host client may combine guest media from the guest client with host media from the host client and with an overlay of the transaction data into a single media stream that is presented with the host client (e.g., by displaying video and/or playing audio). Similarly, the guest client may combine host media from the host client with guest media from the guest client and with an overlay of the transaction data into a single media stream that is presented with the guest client.

Additional methods of combining the transaction data with the multimedia stream include side-by-side or under-and-under configurations without overlaying the transaction data on the multimedia stream. With a side-by-side configuration, the transaction data may be shown on one side of a user interface (e.g., a left side, right side, top side, or bottom side) and the multimedia stream on another side (e.g., on the opposite side). With an under-and-under configuration, the transaction data may be shown below the multimedia stream. With each configuration, the transaction data is updated in real time during transmission of the multimedia stream.

Updates to the transaction data may be propagated live in real-time between the components of the system. For example, the host user may update the numerical value using keyboard inputs and the updates to the numerical value are sent to the intermediary application. The intermediary application processes the updates and propagates the updated numerical value by sending the updated numerical value to the host application and the guest application, which respectively store the updated numerical value in the host local cache and the guest local cache. The update to the guest local cache may trigger an update to the display of the transaction data overlaid onto the multimedia stream by the guest application to reflect the updated transaction data stored in the guest local cache.

In one embodiment, the state machine may be updated using multimedia stream data. For example, the host data or guest data may include a timestamp, frame of video, a hash value generated from the multimedia stream, etc. that is stored to the primary data store and required by the state machine to transition to the next state. The multimedia stream data may be used to indicate that the multimedia stream is active between the host user and the client user and verify that both the host user and the client user participated in initiating the transaction.

Updates to the state machine may be stored with or without using a hash chain. As an example using a hash chain, an update to the state machine may be stored in a block of the hash chain, which is an immutable block whose value cannot be changed without corrupting the hash values of subsequent blocks of the hash chain. The block includes a payload and a hash value. The payload includes transaction data, host data, guest data, an identifier for the present state of the state machine, an identifier for the next state of the state machine, etc. The payload and parts of the data within the payload may also be encrypted to protect the private information within the payload. The hash value is generated by hashing the payload and a previous hash value, which is the hash value from a previous block from the hash chain.

In Step 208, provider data is generated responsive to updating the state machine with the host data and the guest data. After all of the information for initiating a transaction has been received by the intermediary application with the state machine being appropriately updated, the intermediary application may generate the provider information. The provider data may identify a data record of the host user that is used to perform a transaction.

In one embodiment, the intermediary application may look up a uniform resource locator (URL) comprising a domain of the transaction server and further identifying an account of the host user. When the URL is opened by the guest client, the transaction application may conduct the transaction.

In one embodiment, the intermediary application may generate a URL with one or more parameters appended to the URL. The URL is served by the transaction server and the transaction application initiates the transaction responsive to the guest client opening the URL that includes the parameters. As an example, the parameters may include tokens, certificates, signatures, etc. of the host user and the guest user for performing the transaction.

In Step 210, the provider data is sent to the guest client. The provider data is presented with the multimedia stream by the guest application on the guest client. The provider data may be overlaid on top of the media (including the host media) displayed by the guest application on the guest client.

The guest client may execute the transaction using the provider data. For example, the guest client may open a link of the provider data in a browser application that is separate from the guest application. The guest user may follow the steps used by the website hosted by the URL from the provider data to perform the transaction. As an example, when the transaction is a payment transaction, the guest user may be familiar with the website of a certain payment processing services provider and use a browser executing on the guest client to conduct the transaction with the familiar website.

The guest client may execute the transaction while maintaining the multimedia stream. As an example, an external website of a transaction provider may be overlaid on top of the multimedia stream presented by the guest application on the guest client. In this manner, a single application may be presented to the user for initiating and executing the transaction.

Figure 3:
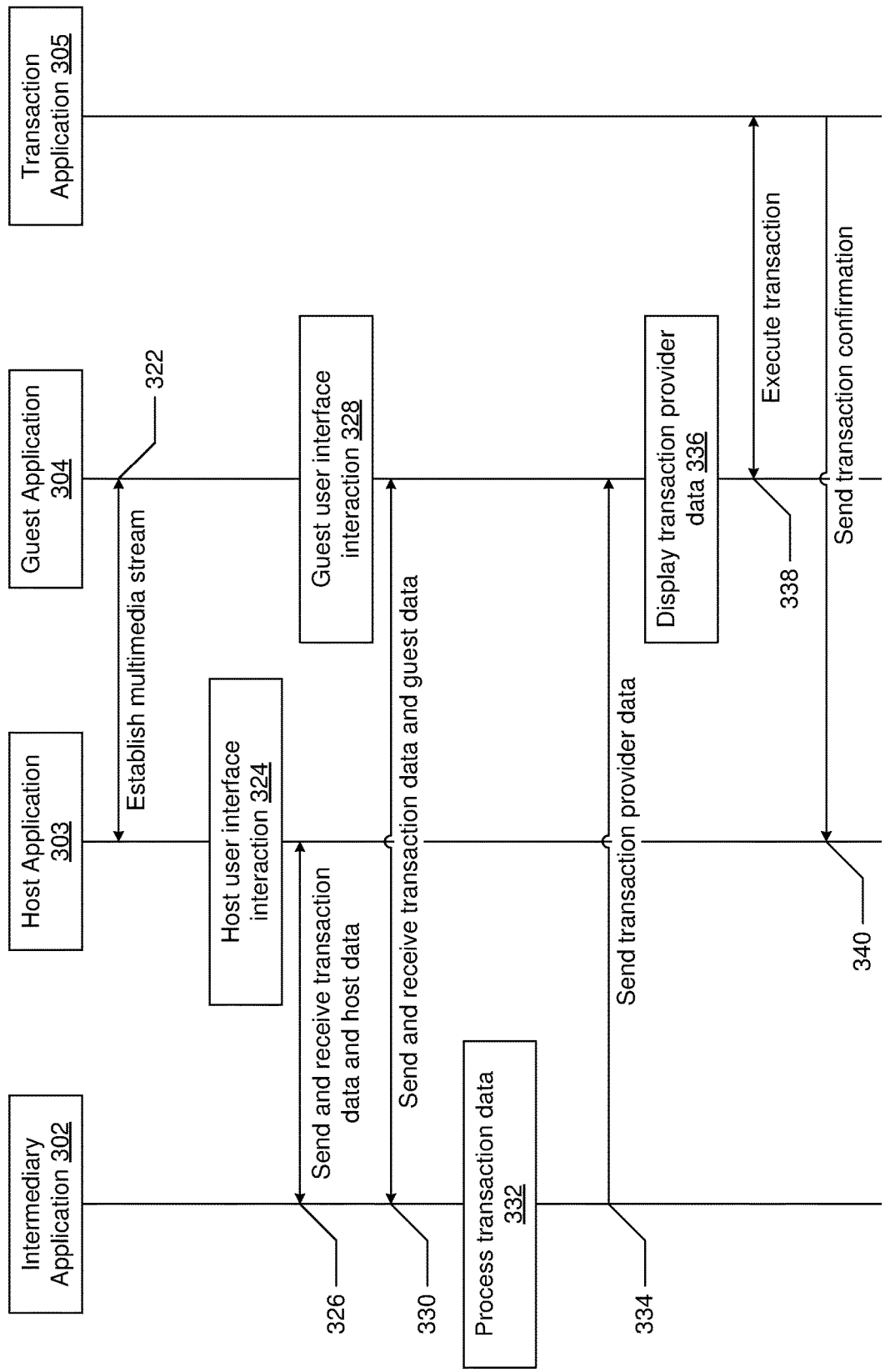
FIG. 3 shows a sequence diagram in accordance with disclosed embodiments.

FIG. 3 and FIG. 4A through FIG. 4E show examples of sequences, systems, and interfaces in accordance with the disclosure. FIG. 3 shows a sequence diagram for performing transactions over live media. FIGS. 4A through 4E show an example of a user interface used to perform transactions over live media. The embodiments of FIG. 3 and FIG. 4A through FIG. 4E may be combined and may include or be included within the features and embodiments described in the other figures of the application. The features and elements of FIG. 3 and FIG. 4A through FIG. 4E are, individually and as a combination, improvements to the technology of computing systems and streaming media systems. The various features, elements, widgets, components, and interfaces shown in FIG. 3 and FIG. 4A through FIG. 4E may be omitted, repeated, combined, and/or altered as shown. Accordingly, the scope of the present disclosure should not be considered limited to the specific arrangements shown in FIG. 3 and FIG. 4A through FIG. 4E.

Turning to FIG. 3, the sequence (300) is performed with the intermediary application (302), the host application (303), the guest application (304), and the transaction application (305). The applications may execute on computing system in accordance with those described in FIGS. 5A and 5B and, for example, may be a smartphone, a desktop computer, a cloud based server computer, etc.

In Step 322 a multimedia stream is established between the host application (303) and the guest application (304). The multimedia stream may be established using protocols and standards that include the session initiation protocol (SIP), H.323, real-time protocol (RTP), user datagram protocol (UDP), etc. The host user or guest user may share a uniform resource locator (URL) that, when opened, causes the host application (303) and the guest application (304) set up the multimedia stream between the host client and the guest client running the host application (303) and the guest application (304).

In Step 324, the host user interacts with the host user interface of the host application (303). The interaction may include providing host information (account data, contact information, numerical values for a transaction, etc.) to the host application (303).

In Step 326, transaction data and host data are sent between the intermediary application (302) and the host application (303). The transaction data may include host data that was previously sent by the host application (303) and may include guest data that was sent to the intermediary application (302) by the guest application (304). The transaction data may be stored in a local cache of the host application (303).

In Step 328, the guest user interacts with the guest user interface of the guest application (304). The interaction may include providing guest information (account data, contact information, numerical values for a transaction, etc.) to the guest application (304).

In Step 330, transaction data and guest data are sent between the intermediary application (302) and the guest application (304). The transaction data may include guest data that was previously sent by the guest application (304) and may include host data that was sent to the intermediary application (302) by the host application (303). The transaction data may be stored in a local cache of the guest application (304).

In Step 332, transaction data is processed by the intermediary application (302). The intermediary application (302) receives host data and guest data from the host application (303) and the guest application (304) and stores the host data and guest data in a primary data store as transaction data. The intermediary application (302) updates a state machine using the host data and guest data. The intermediary application (302) sends the transaction data back out to the host application (303) and the guest application (304) to update the local caches and the displays of the host application (303) and the guest application (304).

In Step 334, transaction provider data (also referred to as provider data) is sent to the guest application (304). The transaction provider data includes and identifier for the transaction application (305) so that the guest application may execute a transaction with the transaction application (305).

In Step 336, the transaction provider data is displayed by the guest application (304). The transaction provider data may include identifiers that reference multiple different transaction providers. The guest user may select one of the transaction providers (e.g., the transaction provider that maintains the transaction application 305) with which to perform the transaction.

At Step 338, a transaction is executed. In one embodiment, the transaction may be executed using the guest application. In another embodiment, a different application may be executed to execute the transaction with the transaction application. Execution of the transaction may involve sending identifying information about the transaction, the guest user, the host user, etc. to the transaction application (305).

At Step 340, a transaction confirmation may be sent to the host application from the transaction application. As an example, the host user may receive an email that identifies that the transaction has been executed between the guest user and the host user. A notification of the confirmation may be displayed in the host application (303).

Figure 4A:
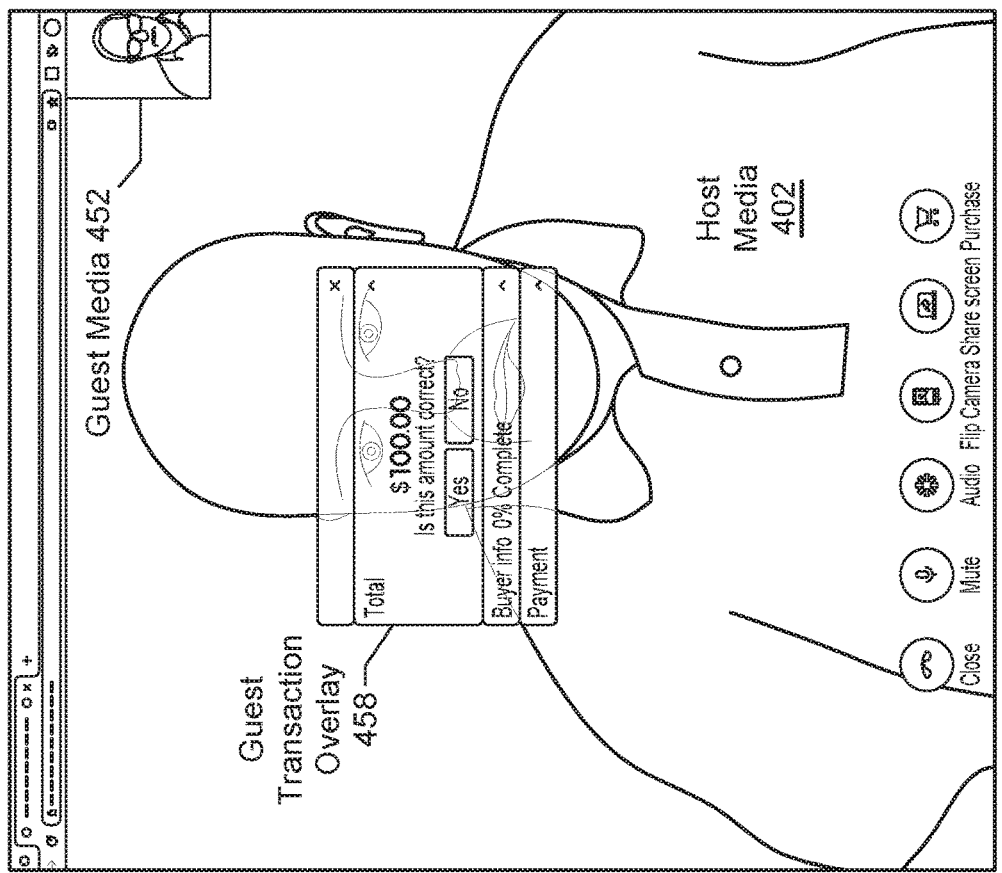
FIG. 4A, FIG. 4B, FIG. 4C, FIG. 4D, and FIG. 4E show examples in accordance with disclosed embodiments.
Figure 4A:
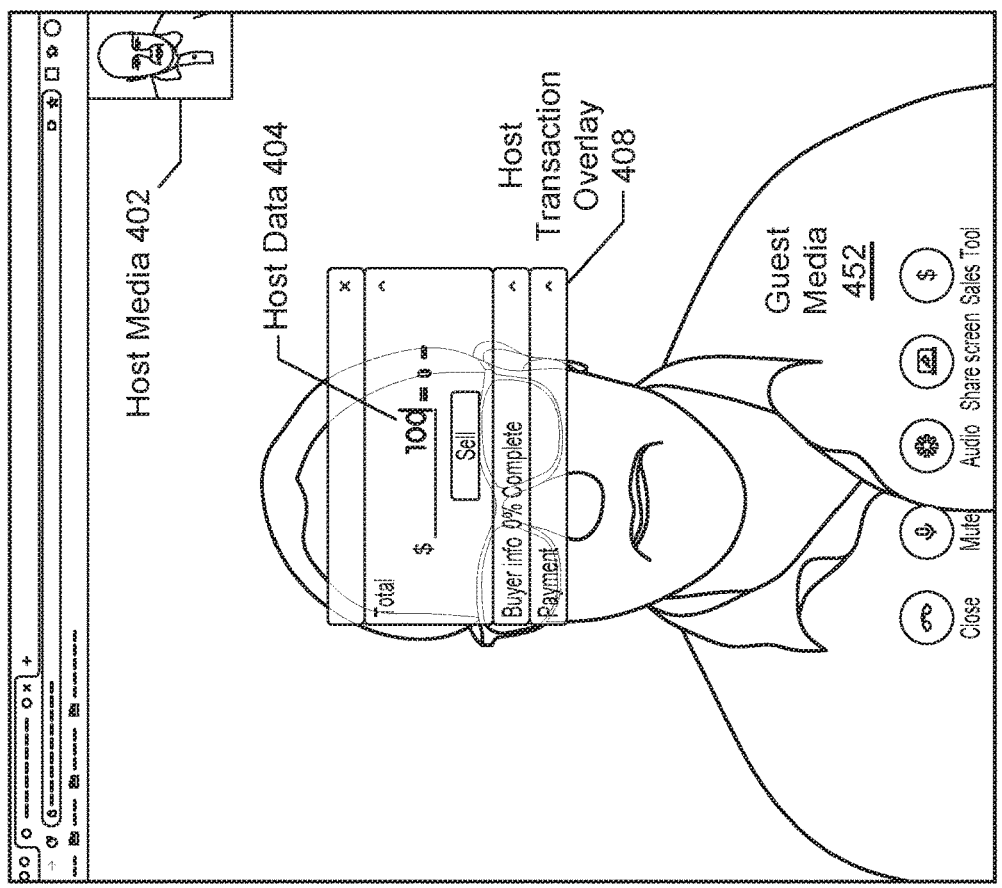

Turning to FIG. 4A, the host application (400) and the guest application (450) are used to initiate a transaction between the host user and the guest user over a live multimedia stream. The host application (400) and the guest application (450) each include a web browser that has opened a videotelephony website to provide video and audio communication between the host user and the guest user for the host user and guest user to discuss a transaction. The video and audio communication is provided with a multimedia streaming connection between the host application (400) and the guest application (450).

The host application (400) displays the guest media (452), which was captured with the guest client that executes the guest application (450). The guest media (452) includes video and audio of the guest user. In a corner of the display of the host application (400), the host media (402) is displayed with video of the host user. The host media (402) is captured with the host client that executes the host application (400). On top of the media being displayed, the host transaction overlay (408) is presented with the host data (404). The host transaction overlay (408) is a user interface with multiple user interface elements to collect host data and display transaction data that includes guest data. The host data (404) includes a numerical value ("(100)") for the transaction being discussed between the host user and the guest user over the multimedia stream.

The guest application (450) displays the host media (402) and the guest media (452). On top of the media being displayed, the guest transaction overlay (458) is presented with transaction data that includes the host data ("(100)"). The guest transaction overlay (458) is a user interface with multiple user interface elements to collect guest data and display transaction data that includes host data.

Figure 4B:
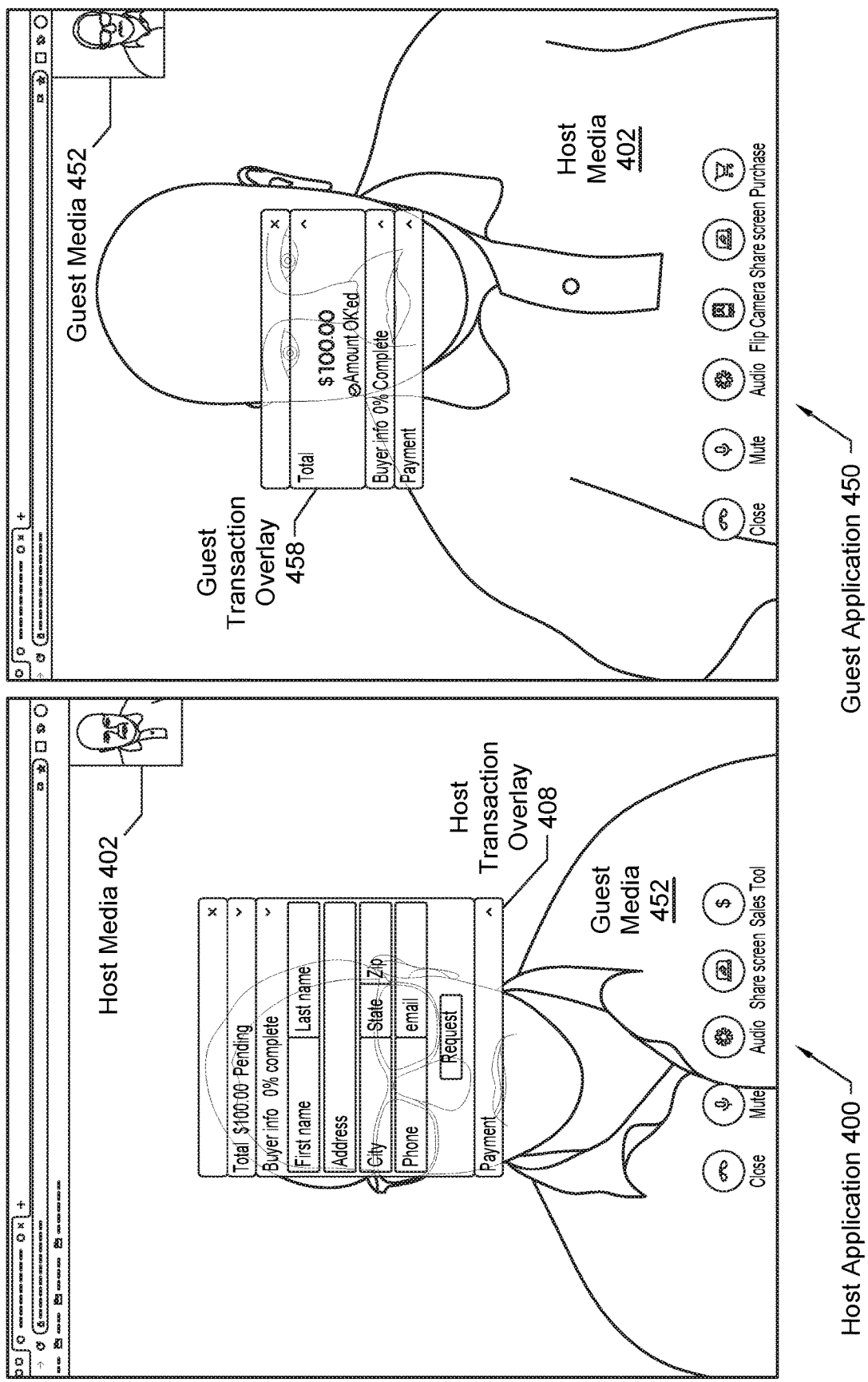

Turning to FIG. 4B, the host media (402) and the guest media (452) continue to stream and be displayed between the host application (400) and the guest application (450).

The host transaction overlay (408) and the guest transaction overlay (458) are updated after the guest user approved the numerical value by selecting a button from the guest transaction overlay (458). The state machine of the intermediary application is updated to indicate that the numerical amount is accepted, the numerical value is store in the primary data store of the intermediary application. The user interface elements of the host transaction overlay (408) and the guest transaction overlay (458) are updated in response to the updates to the state machine. The host transaction overlay (408) is updated to include a request button that, when selected, sends a request to the guest user to provide additional information.

Figure 4C:
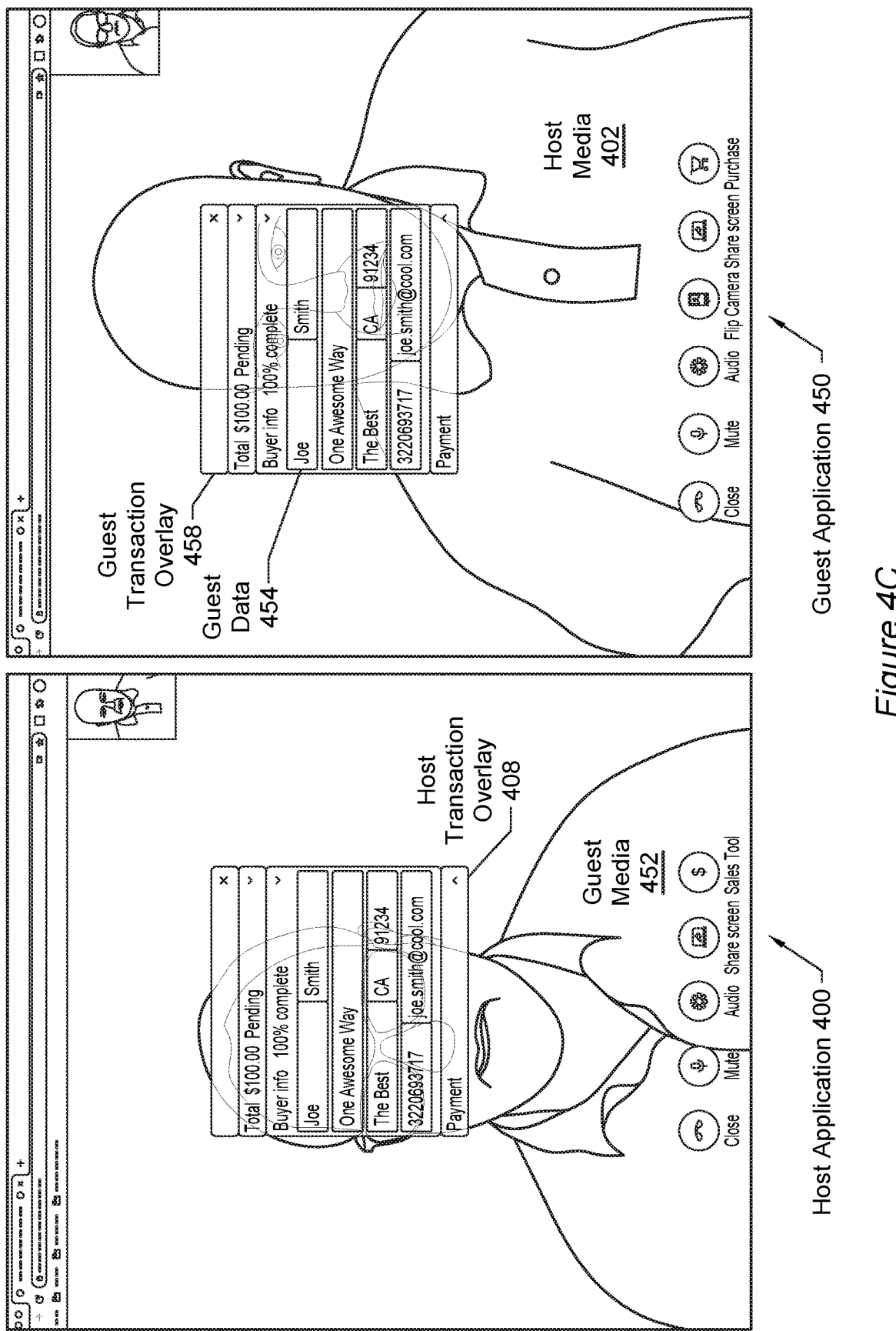

Turning to FIG. 4C, the host transaction overlay (408) and the guest transaction overlay (458) are updated after the request button (shown in FIG. 4B) was selected by the host user. The state machine may be updated from an "accepted numerical amount" state to a "guest information requested" state.

The guest user inputs guest data (454) (name, address, email address, phone number, etc.) into the "Buyer Info" section of the guest transaction overlay (458). As the guest data is entered, the guest data is transmitted to the intermediary application, processed by the intermediary application, sent to the host application (400), and displayed by the host application (400) in the host transaction overlay (408).

Figure 4D:
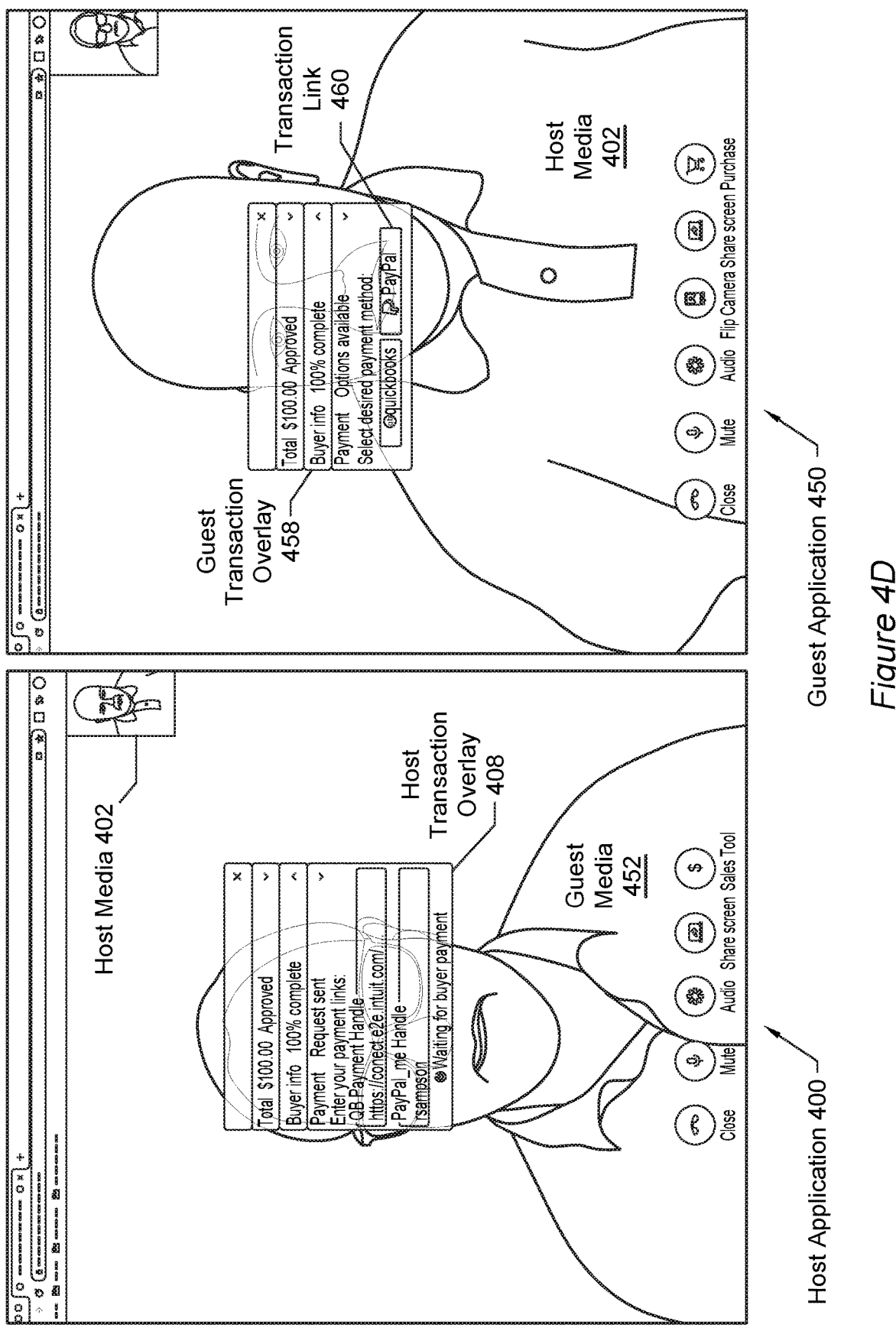

Turning to FIG. 4D, the host transaction overlay (408) and the guest transaction overlay (458) are updated in response to selection of the "Payment" section from either the host transaction overlay (408) or the guest transaction overlay (458). The "Payment" section of the guest transaction overlay (458) includes the transaction link (460) that identifies the transaction application for processing the transaction. The transaction link (460) may identify an account of the host user for initiating the transaction.

Figure 4E:
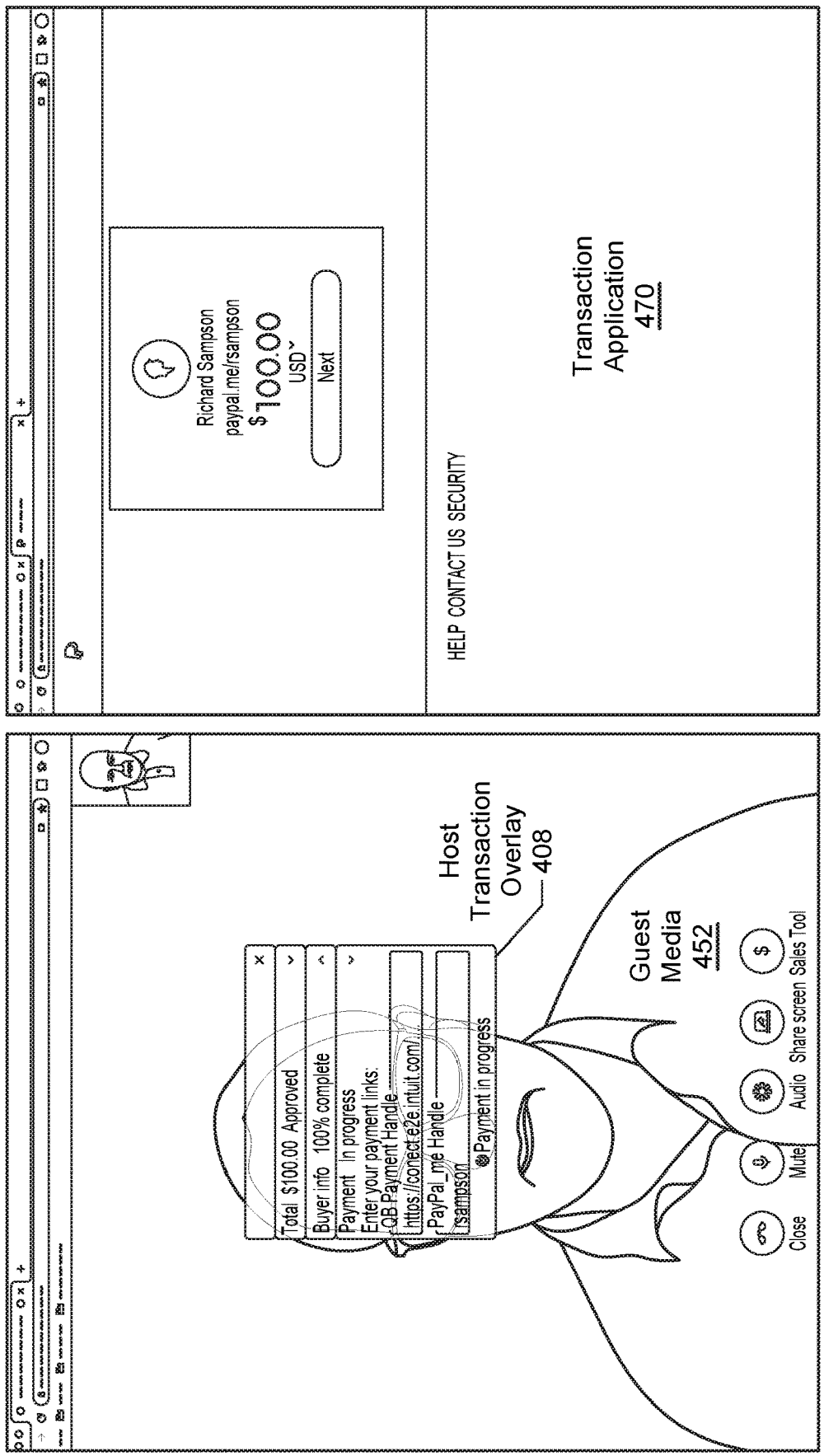

Turning to FIG. 4E, the browser of the guest client is updated to display the transaction application (470) in response to selection of the transaction link (460) (shown in FIG. 4D). The transaction application (470) is presented in a separate tab of the browser application that presented the guest application. The guest user may interact with the transaction application (470) to execute the transaction that was discussed using the host application (400) and the guest application (450) (shown in FIG. 4D).

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and 508) may be locally or remotely connected to the computer processor(s) (502), non-persistent storage (504), and persistent storage (506). Many different types of computing systems exist, and the aforementioned input and output device(s) (510 and 508) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the disclosure has described a limited number of embodiments, those skilled in the art, having benefit of this disclosure, will appreciate that other embodiments can be devised which do not depart from the scope of the disclosure. Accordingly, the scope of the subject matter should be limited only by the attached claims.

What is claimed is:

1. A method comprising:
    receiving, at an intermediary application and after a host client executing a host application establishes a multimedia stream with a guest client executing a guest application, host data from the host application;
    updating a state machine using the host data;
    receiving, at the intermediary application, guest data from the guest application and updating the state machine using the guest data;
    propagating, by the intermediary application, transaction data between the host application and the guest application, wherein the transaction data comprises the host data and the guest data;
    presenting, together with the multimedia stream, at least some of the transaction data in both a first overlay presented by the host application and a second overlay presented by the guest application, wherein:
        the first overlay and the second overlay are displayed over the multimedia stream,
        the transaction data further comprises a numerical value from the transaction data of a transaction,
        the numerical value is presented in both the first overlay and the second overlay, and
        the transaction transfers the numerical value from a first data record to a second data record;
    generating, by the intermediary application, provider data responsive to updating the state machine with the host data and the guest data;
    sending the provider data to the guest client, wherein the provider data is presented with the multimedia stream by the guest application on the guest client; and
    storing an update to the state machine in a block of a hash chain, the block comprising a payload and a hash value, the hash value generated by hashing the payload and a previous hash value from a previous block from the hash chain.

2. The method of claim 1, wherein the guest client executes the transaction using the provider data.

3. The method of claim 1, wherein the guest client executes the transaction while maintaining the multimedia stream.

4. The method of claim 1, further comprising:
    updating the state machine using multimedia stream data.

5. The method of claim 1, wherein the multimedia stream comprises guest media captured with the guest client and presented by the host application with the guest data on the host client.

6. The method of claim 1, wherein the multimedia stream comprises host media captured with the host client and presented by the guest application with the host data on the guest client.

7. The method of claim 1, wherein the guest application overlays the host data onto a display of the multimedia stream in real time on the guest client.

8. The method of claim 1, wherein the host application overlays the guest data onto a display of the multimedia stream in real time on the host client.

9. A system comprising:
    a processor;
    a memory;
    an application with instructions stored in the memory that execute on the processor and are configured for:
        receiving, at an intermediary application and after a host client executing a host application establishes a multimedia stream with a guest client executing a guest application, host data from the host application;
        updating a state machine using the host data;
        receiving, at the intermediary application, guest data from the guest application and updating the state machine using the guest data;
        propagating, by the intermediary application, transaction data between the host application and the guest application, wherein the transaction data comprises the host data and the guest data;
        presenting, together with the multimedia stream, at least some of the transaction data in both a first overlay presented by the host application and a second overlay presented by the guest application, wherein:
            the first overlay and the second overlay are displayed over the multimedia stream,
            the transaction data further comprises a numerical value from the transaction data of a transaction,
            the numerical value is presented in both the first overlay and the second overlay, and
            the transaction transfers the numerical value from a first data record to a second data record;
        generating, by the intermediary application, provider data responsive to updating the state machine with the host data and the guest data;
        sending the provider data to the guest client, wherein the provider data is presented with the multimedia stream by the guest application on the guest client; and
        storing an update to the state machine in a block of a hash chain, the block comprising a payload and a hash value, the hash value generated by hashing the payload and a previous hash value from a previous block from the hash chain.

10. The system of claim 9, wherein the guest client executes the transaction using the provider data.

11. The system of claim 9, wherein the guest client executes the transaction while maintaining the multimedia stream.

12. The system of claim 9, wherein the instructions are further configured for:
    updating the state machine using multimedia stream data.

13. The system of claim 9, wherein the multimedia stream comprises guest media captured with the guest client and presented by the host application with the guest data on the host client.

14. The system of claim 9, wherein the multimedia stream comprises host media captured with the host client and presented by the guest application with the host data on the guest client.

15. The system of claim 9, wherein the guest application overlays the host data onto a display of the multimedia stream in real time on the guest client.

16. The system of claim 9, wherein the host application overlays the guest data onto a display of the multimedia stream in real time on the host client.

17. A system comprising:
a processor;
a memory;
a host application stored in the memory and which executes on the processor;
an intermediary application stored in the memory and which executes on the processor;
the host application configured for:
  establishing a multimedia stream with a guest client;
the intermediary application configured for:
  receiving, after a host client establishes a multimedia stream with the guest client, host data from the host application;
  updating a state machine using the host data;
  receiving guest data from a guest application executing on the guest client and updating the state machine using the guest data;
  propagating transaction data between the host application and the guest application, wherein the transaction data comprises the host data and the guest data;
  presenting, together with the multimedia stream, at least some of the transaction data in both a first overlay presented by the host application and a second overlay presented by the guest application, wherein:
    the first overlay and the second overlay are displayed over the multimedia stream,
    the transaction data further comprises a numerical value from the transaction data of a transaction, the numerical value is presented in both the first overlay and the second overlay, and
    the transaction transfers the numerical value from a first data record to a second data record;
the host application further configured for:
  presenting the guest data with the multimedia stream on the host client;
the intermediary application further configured for:
  generating provider data responsive to updating the state machine with the host data and the guest data,
  sending the provider data to the guest client, wherein the provider data is presented with the multimedia stream by the guest application on the guest client; and
  storing an update to the state machine in a block of a hash chain, the block comprising a payload and a hash value, the hash value generated by hashing the payload and a previous hash value from a previous block from the hash chain.

18. The method of claim 1, wherein:
the state machine comprises a data structure that includes a plurality of states that may be transitioned between based on inputs received by the intermediary application,
transitions of the state machine identify data used to proceed from one state of the plurality of states to a different state of the plurality of states, and
the plurality of states of the state machine relate to the transaction between the host application and the guest application.

\* \* \* \* \*